US006980825B1

United States Patent
Andersen et al.

(10) Patent No.: US 6,980,825 B1
(45) Date of Patent: Dec. 27, 2005

(54) COMMUNICATION UNIT WITH PERSONALIZING FEATURE

(75) Inventors: Jesper Andersen, Copenhagen (DK); Jan Kilund, Hellerup (DK); Mohammad Asaf, Brondby (DK)

(73) Assignee: Nokia Mobile Phones Limited, Espoo (FI)

( * ) Notice: Subject to any disclaimer, the term of this patent is extended or adjusted under 35 U.S.C. 154(b) by 693 days.

(21) Appl. No.: 09/644,067

(22) Filed: Aug. 23, 2000

(51) Int. Cl.[7] ............................. H04M 1/00; H04B 1/38
(52) U.S. Cl. ................... 455/550.1; 455/575.1; 455/90.3; 379/433.01; 379/433.11
(58) Field of Search ..................... 455/550.1, 90.3, 455/575.1, 575.8, 566, 575, 90; 379/433.01, 433.04, 433.07, 433.11, 428.03, 368

(56) References Cited

U.S. PATENT DOCUMENTS

| | | | | |
|---|---|---|---|---|
| 3,921,322 A | * | 11/1975 | Sharp | 40/104.19 |
| 4,405,219 A | * | 9/1983 | Yasuda et al. | 353/37 |
| 5,025,581 A | | 6/1991 | Polzin | |
| 5,113,435 A | * | 5/1992 | Chen | 379/441 |
| 5,502,912 A | * | 4/1996 | LeBoff et al. | 40/643 |
| 5,619,814 A | * | 4/1997 | Herrndobler | 40/358 |
| 5,664,013 A | | 9/1997 | Rossi | |
| 6,628,971 B1 | * | 9/2003 | Yoon et al. | 455/566 |

FOREIGN PATENT DOCUMENTS

| | | |
|---|---|---|
| DE | 298 11 564 U1 | 9/1998 |
| GB | 2 325 371 A | 11/1998 |
| JP | 11-284705 | 10/1999 |
| WO | WO 99/40706 | 8/1999 |

* cited by examiner

*Primary Examiner*—Lee Nguyen
*Assistant Examiner*—Eugene Yun
(74) *Attorney, Agent, or Firm*—Antonelli, Terry, Stout & Kraus, LLP (57) ABSTRACT

A communication unit with personalizing feature, where the communication unit is provided with a holder for holding a releasable picture in an exposable place of the communication unit. The holder can according to the invention be located on either the back cover part of the communication unit or in a display assembly of the communication unit. In one embodiment the holder includes a plastic film that is attached along one of its sides to a transparent part of the communication unit, e.g. back cover part. The plastic film can be lifted and a picture can be placed between the holder and the back cover. To improve the holding feature of the holder the holder could be provided with an adhesive that holds the picture in it's exposable position. In another embodiment the holder is included in the display assembly and having an insert that holds the picture in an exposable position.

22 Claims, 9 Drawing Sheets

COMMUNICATION UNIT WITH PERSONALIZING FEATURE

BACKGROUND OF THE INVENTION

1. Field of the Invention

The invention relates to a communication unit having features for making the communication unit more personalized. The personalizing feature includes a holder for providing the communication unit with a picture.

2. Description of the Prior Art

It is known from, for example, mobiles phones made by Nokia™ to personalize a mobile phone by changing cover parts to a personal choice, to change the ringing-tune to a personal one or to download a personally selected operator icon. Its is also known that the user can create the ringing tunes and the operator icon by himself if the operator wants to. There are several websites on the Internet providing tools for downloading personally chosen ringing-tunes or operator icons, as well as tools for the user to create his/her own personal ringing-tunes or operator icons.

SUMMARY OF THE INVENTION

The invention provides a mobile phone with a possibility for the user to personalize his/her phone with a picture or for anyone selling phones to provide their phones with a specific picture. The picture is, according to a first preferred embodiment, placed in a picture guide or holder placed in a cover part of the mobile phone covering the battery. The user can easily remove or open the guide/holder and replace the personal picture with another personal picture. The picture is visible through a transparent part of the cover part of the phone. In another preferred embodiment the picture has been placed in a holder in the display assembly of a mobile phone.

The invention provides flexible means for a user to personalize his/her communication unit.

According to a first preferred embodiment of the invention, a picture guide for a communication unit has a holder for holding a releasable picture, where the holder enables the user to easily place or replace a picture in the communication unit.

According to another preferred embodiment of the invention, a holder holds a releasable picture located in the display assembly of the communication unit enabling the user to easily place or replace a personal picture in the communication unit.

The invention also provides a method for personalizing a communication unit.

The invention is a method of providing the communication unit with a holder or picture guide and placing or replacing a picture in the holder or picture guide.

BRIEF DESCRIPTION OF THE DRAWINGS

The invention will be explained more fully below, by way of example, in connection with preferred embodiments and with reference to drawing, in which.

DETAILED DESCRIPTION OF THE INVENTION

Figure 1:
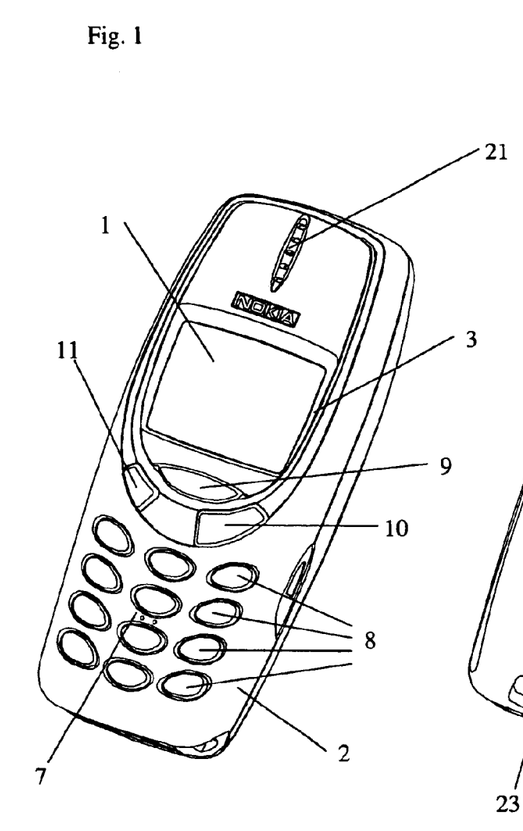
FIGS. 1–2 show in a perspective view a preferred embodiment of the communication unit according to the invention.
Figure 2:
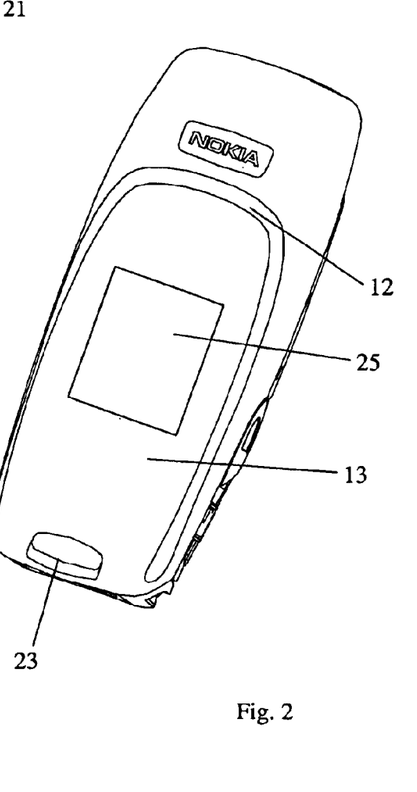

According to a first aspect, the communication unit with a personalizing feature according to the invention is described with reference to a hand portable phone, preferably a cellular/mobile phone. A preferred embodiment of this phone is shown in FIGS. 1 and 2, where a cellular/mobile phone is shown in perspective. As will be seen, the phone is provided with a front cover 2 having a window frame 3 encircling the protection window of the display assembly 1. The cellular/mobile phone comprises a user interface having an on/off button 4, a keypad 7, a battery 14 (not shown), a display/LCD 43, an earpiece 21 and a microphone 22 (not shown). The phone in FIG. 2 is shown from another perspective, where a back cover 13 is visible. There is also shown in FIG. 2 a release device 23 for releasing the back cover 13 from the rest of the phone, a transparent part 25 on the back cover 13, and a horseshoe shaped edge 12.

The horseshoe shaped recess 12 prevents the user from covering the internal antenna 24 (not shown) placed in the upper part of the phone with his fingers. Any covering of the antenna 24 by the user might disturb the function of the antenna 24. The horseshoe shaped recess 12 is ergonomically designed to make the user place his fingers on it and not on the antenna part of the back cover 13.

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0–9" or a sign "#" or "*", respectively. In alpha mode each key is associated with a number of letters and special signs used in the text editing.

The keypad 7 additionally comprises a menu selection key 9, a up/down key 10, and a cancel key 11. The functionality of the menu selection key or NaviKey™ 9 depends on the state of the phone. The NaviKey™ 9 is used together with the up/down key 10, where the selection/navigation is made by the NaviKey™ 9 and the scrolling in the menus is made by the up/down key 10. The functionality of the NaviKey™ 9 changes depending on the menus and its present functionality is shown in a separate field in the display 43 just above the NaviKey™ 9. The cancel key 11 is used to delete an input or cancel the last selection and jump to the previous menu level.

The menu selection key 9 is placed centrally on the front surface of the phone between the display 43 and the group of alphanumeric keys 8. Hereby the user will be able to control this key 9 with his thumb. This is the best site to place an input key requiring precise motor movements. Many experienced phone users are used to one-hand handling. They place the phone in the hand between the fingertips and the palm of the hand. Hereby the thumb is free for inputting information.

Figure 3:
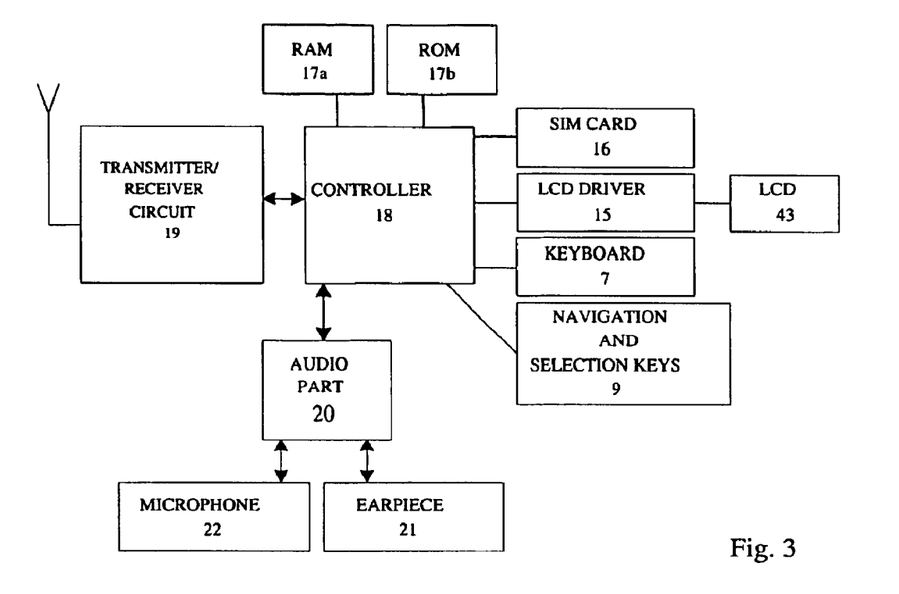
FIG. 3 schematically shows the essential parts of a telephone for communication with a cellular network.

FIG. 3 schematically shows the most important parts of a preferred embodiment of the phone/terminal, the parts being essential to the understanding of the invention. The microphone 22 records the user's speech, and the analog signals formed thereby are A/D converted in an A/D converter (not shown) before the speech is encoded in an audio part 20. The encoded speech signal is transferred to the controller 18 (physical layer processor), which e.g. supports GSM terminal software. The controller 18 also forms the interface to the peripheral units of the apparatus, including RAM and ROM memories 17a and 17b, a SIM card 16, the display 43 and the keypad 7 (from FIG. 1) as well as data, power supply, etc. The controller 18 communicates with the transmitter/receiver circuit 19. The audio part 20 speech-decodes the signal, which is transferred from the controller 18 to the earpiece 21 via a D/A converter (not shown).

The preferred embodiment of the phone of the invention is for use in connection with a GSM network, but, of course, the invention may also be applied in connection with other phone networks. It could be cellular networks, various forms of cordless phone systems or in dual band phones accessing sets of these systems/networks.

The controller 18 is connected to the user interface of the mobile phone. Thus, it is the controller 18, which monitors the activity in the phone and controls the display 43 in response thereto.

Therefore, it is the controller 18, which detects the occurrence of a state change event and changes the state of the phone and thus the display text. The user may cause a state change event, when he/she activates the keypad 7 including the menu selection key or keys 9, and these type of events are called entry events or user events. However, the network communicating with the phone may also cause a state change event. These type of events and other events beyond the user's control are called non-user events. Non user events comprise status change during call set-up, change in battery voltage, change in antenna conditions, message on reception of SMS, etc.

An embodiment of the invention will be described with reference to FIGS. 4 to 12 showing the various features of a communication unit with personalizing feature.

Figure 4:
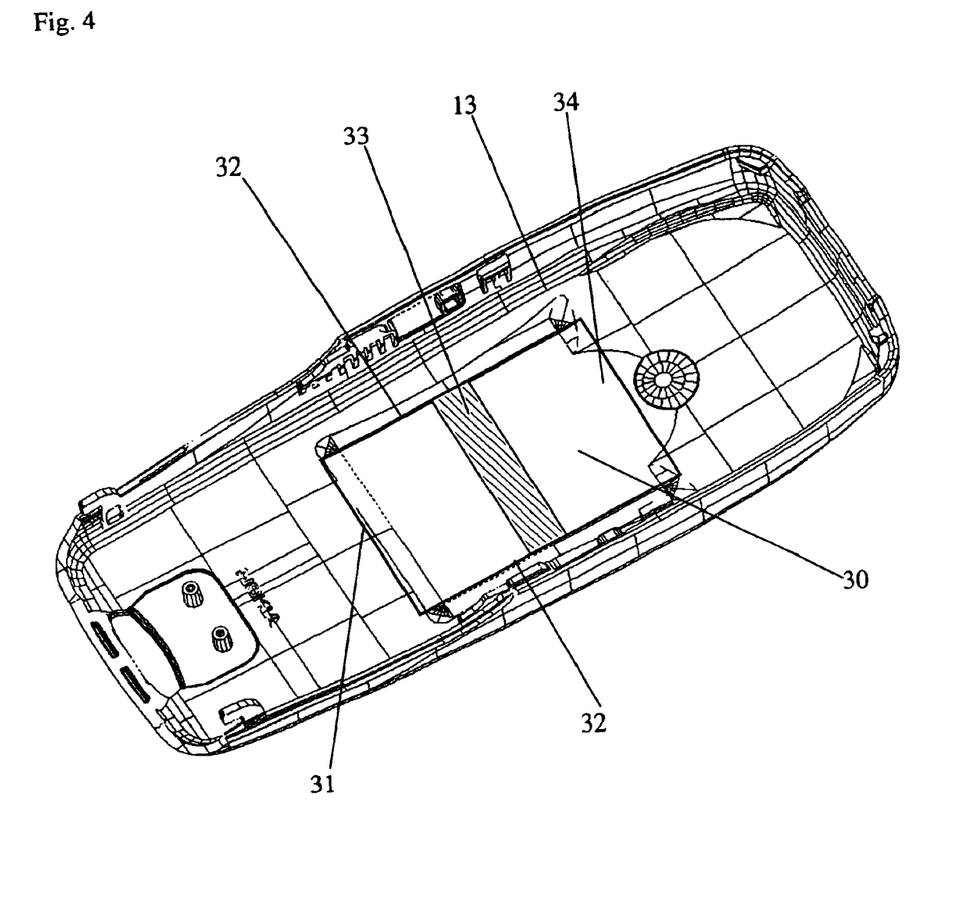
FIG. 4 shows a cover part of a communication unit with a picture guide according to a preferred embodiment.

In FIG. 4 is shown a cover part 13, that is the back cover, which is removable from the mobile phone. The back cover 13 can be entirely transparent, semi-transparent or just having a transparent part 25. On the back cover 13 is a piece of plastic film 30 that is attached to the back cover 13 along one side of the film 30 with a strong adhesive. In FIG. 4 the film 30 is attached along one of its shorter sides 31, but it could also be along one of its longer sides 32. The plastic film 30 includes a middle part 33 having a surface provided with an adhesive. The purpose of the adhesive is to hold a picture in the same place as the picture was originally placed. The adhesive does not harm the picture and can be of the same type as used in Post-it™ notes.

A user lifts the plastic film 30 in the loose end 34 and places a picture under plastic film 30, where after the user releases the plastic film 30. The communication unit has been personalized. The picture is visible through a transparent part 25 on the back cover 13 (shown in FIG. 2). The user only lifts the plastic film 30 and removes the picture if he/she wants to replace with another the picture, or removes it without replacing if he/she so wishes. To facilitate the lifting the plastic film 30 could be provided with some finger grooves in one corner (not shown).

Figure 5:
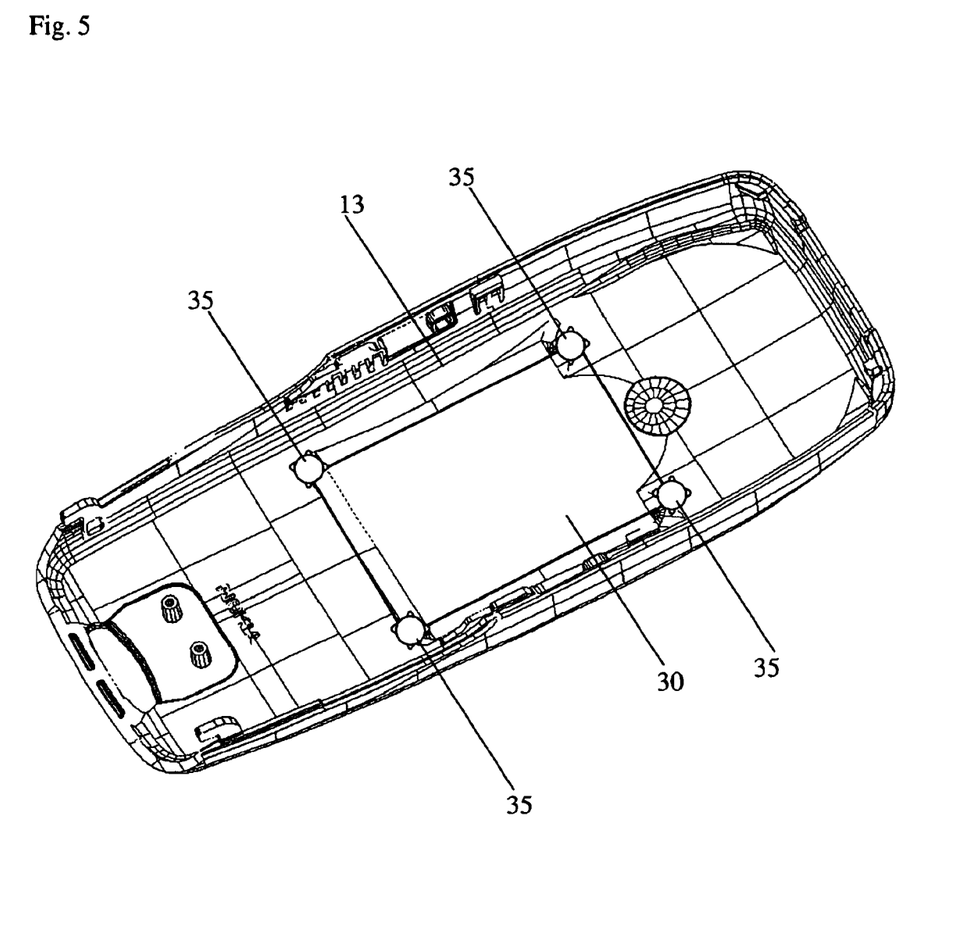
FIG. 5 shows a cover part of a communication unit with a picture guide according to a second preferred embodiment.

In FIG. 5 is shown another embodiment of the invention having attached to the small stickers 35 that are placed in all corners of the picture to keep it in place. The stickers 35 could be of a disposable type or a reusable type, and does not harm the picture.

Figure 6:
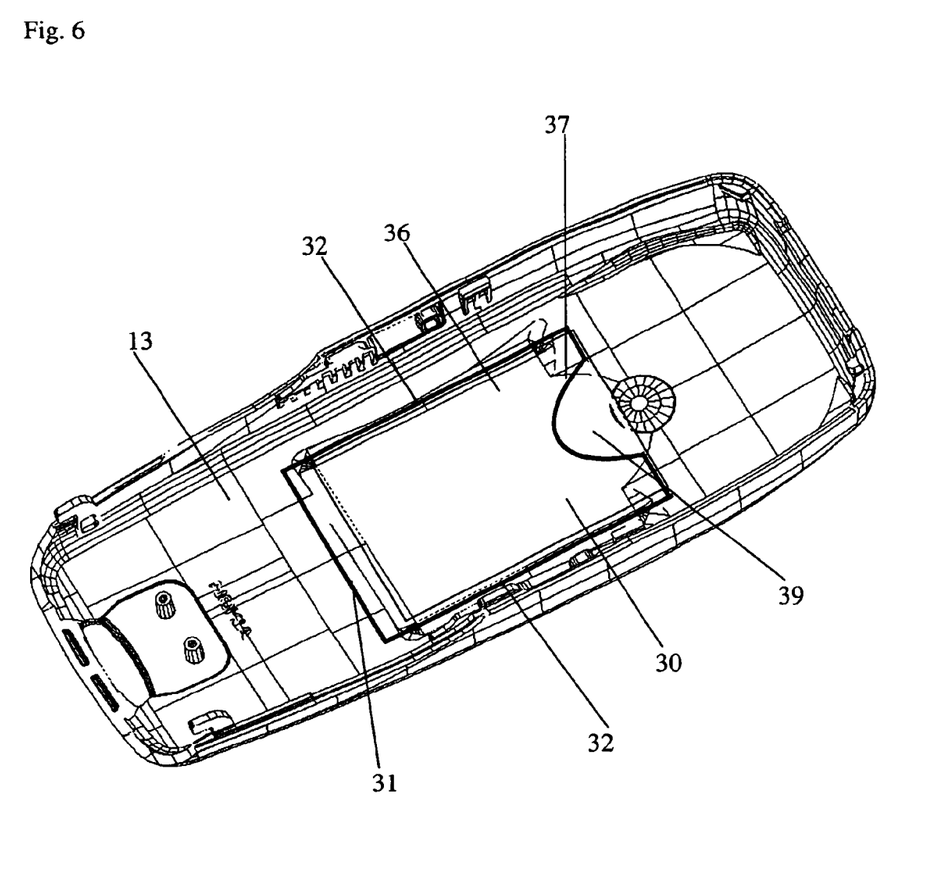
FIG. 6 shows a cover part of a communication unit with a picture guide according to a third preferred embodiment.

In FIG. 6 is a plastic film 36 or the like attached to the back cover 13 along three sides of the plastic film 36, creating a pocket, that is a picture guide or holder 30, for holding a picture. The picture 39 can be inserted under the plastic film 36 by the fourth, open side 37 of the film 36.

Figure 7:
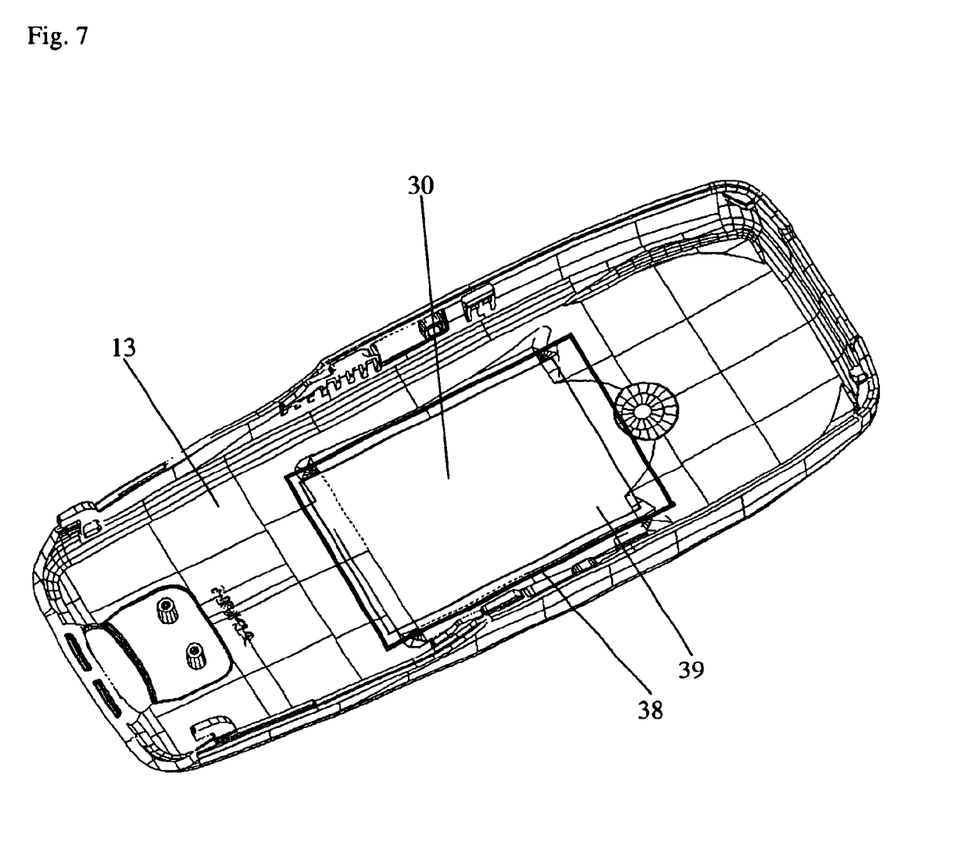
FIG. 7 shows a cover part of a communication unit with a picture guide according to a fourth preferred embodiment.

In FIG. 7 a picture is placed on the back cover 13 having an adhesive, transparent film 38 that covers the picture 39 and attaches it to the back cover 13.

In the illustrated alternative embodiments, the picture guide 30 is placed on the back cover 13 of the communication unit, but it is apparent that the holder or picture guide 30 could also be placed on a surface that is covered by the back cover 13 as long as the part of the back cover 13 covering the picture guide 30 is transparent. In the illustrated communication unit the back cover 13 covers an internal battery 14 and therefore the battery 14 might in this case be holding the holder or picture guide 30 or be the surface whereon the picture guide 30 is attached.

Furthermore is it apparent that the transparent part of the back cover 13, if the back cover 13 is not entirely transparent, could have other shapes than a rectangular shape although it has not been shown along with the preferred embodiments. The alternative shapes could perhaps be adjusted to the design of the phone-cover.

Figure 8:
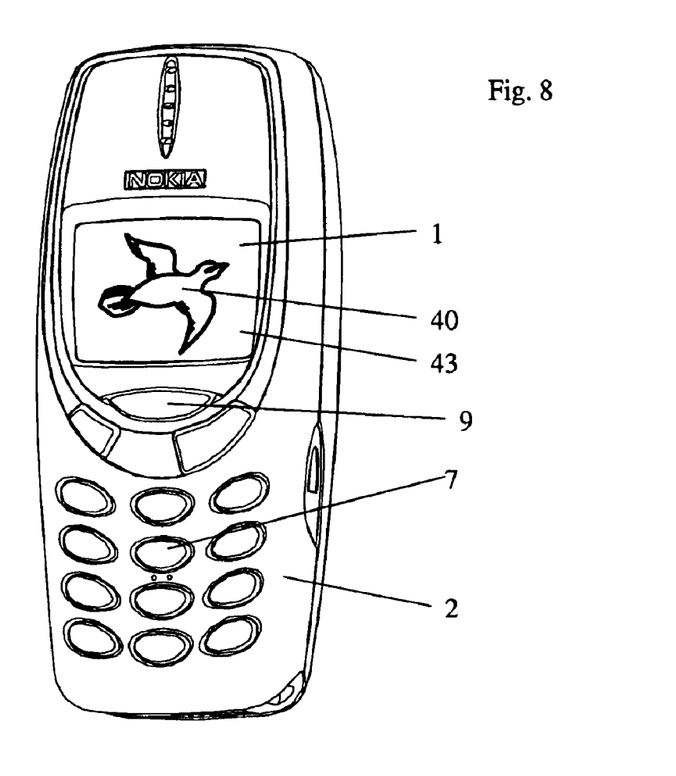
FIG. 8 shows a picture in a communication unit according to another embodiment located behind the display of the communication unit.

According to an alternative preferred embodiment of the communication unit shown in FIG. 8 the holder is located in the display assembly 1 having a picture 40 visible in the display 43. The holder in the display assembly 43 includes a slot created between the display 43 and the light guide 42, where the display 43 is the front wall through which the picture 40 is visible and the light guide 42 is the back wall.

When the communication unit is in operating mode the display 43 will also normally show two bars indicating the signal strength and the battery level, an identification of the operator to which the phone is presently connected, a time indication and a label indicating the present functionality of the menu selection key or NaviKey™ 9. These indications are not shown in any figures for simplifying the figures. To replace picture 40 with another picture 40 or to remove entirely the front cover 2 is removed. The removal of the picture 40 will be described in connection with the description of FIGS. 9 and 10.

Figure 9:
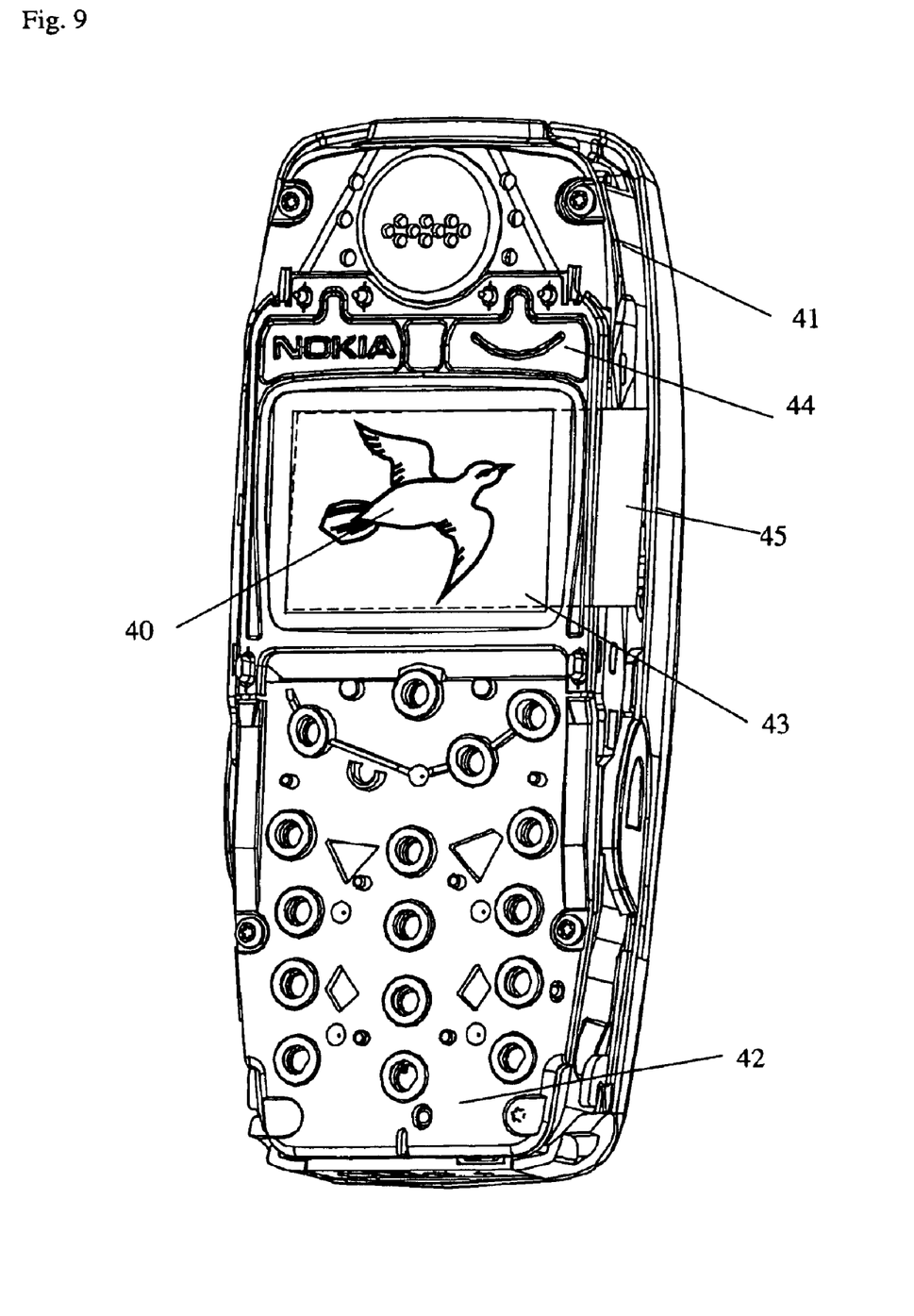
FIG. 9 shows the embodiment in FIG. 8 having the front cover removed according to a first alternative embodiment.

In FIG. 9 the front cover 2 is removed and an inner part 41 of the communication unit is visible. The interesting details for this invention are the light guide 42, which stretches over the entire front of the inner part 41, a display 43, a display holder 44 and the picture 40. The light guide 42 transfers light from LED's to the keypad 7 shown in FIG. 8 and to the display 43. The display 43 is placed on top of the light guide 42 and is fastened to the light guide 42 by means of the display holder 44.

The picture 40 includes an extractive part 45 that stretches out from the holder behind the display 43 and enabling the user to pull out the picture 40 from the holder and replace it with another picture 40. The extractable part 45 could be a part of the picture 40 that just stretches out of the display 43 or a blank part serving just as an extractable part. There could also be indicated on the extractable part 45 a description (not shown) of what the picture 40 describes.

To be able to insert the picture 40 into the holder in the display assembly, but still illuminate the picture 40 by the light guide 42, a small slot has been created between the display 43 and the light guide 42, by removing some material from the top surface of the light guide 42. Normally the display 43 is placed close to the light guide 42, but having removed some material from the light guide 42 this creates a small slot that enables the picture 40 to be inserted into the holder located behind the display 43. The holder is a slot where the display serves as the front wall and the light guide 42 as the back wall, and is made just as big as to receive a picture 40 covering the visual background of the display 43. Furthermore a sidewall (not shown) on the inner part 41 holding the light guide 42 to the inner part 41 has been modified to enable the insertion of the picture 40 behind the display 43.

Figure 10:
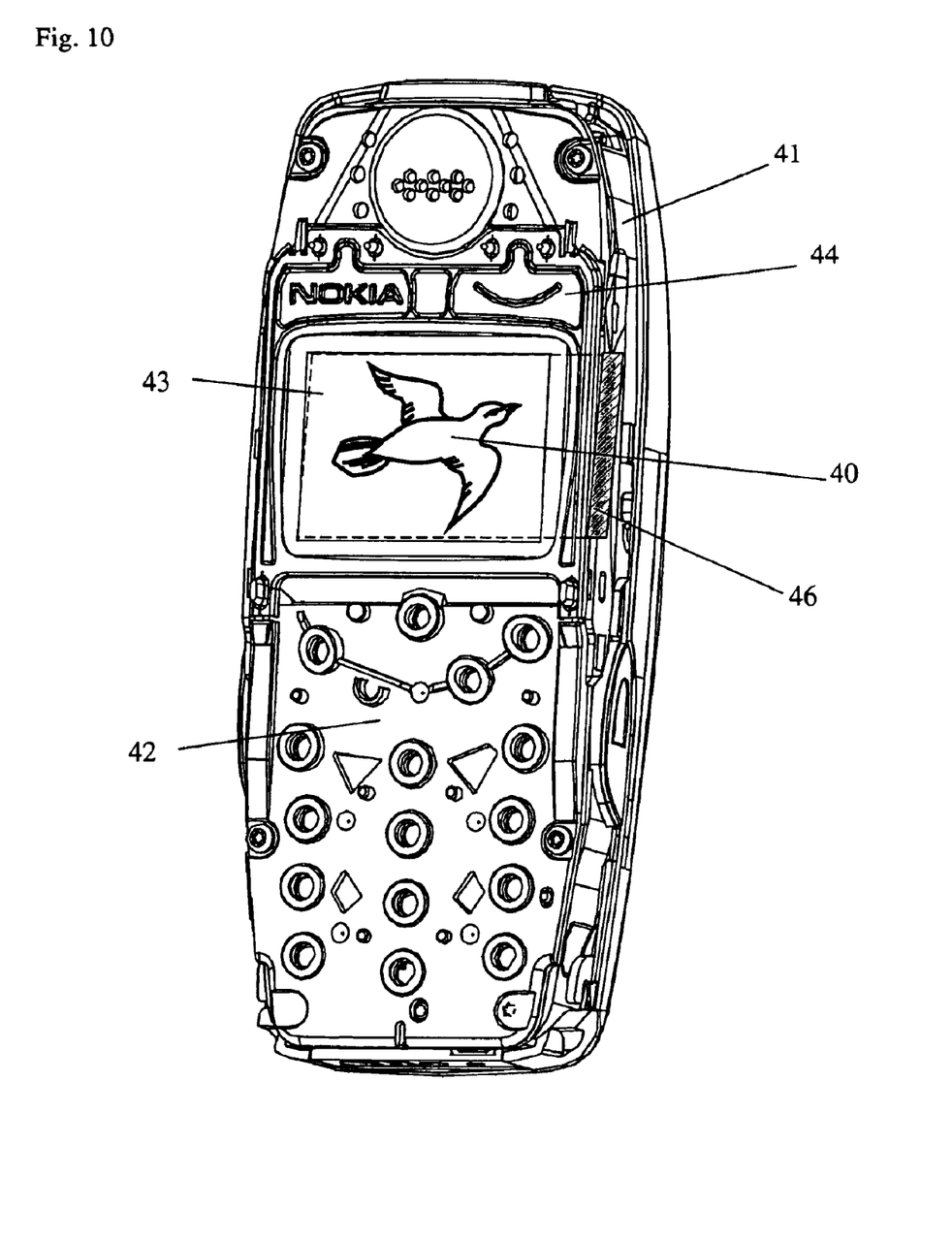
FIG. 10 shows the embodiment in FIG. 8 having the front cover removed according to a second alternative embodiment.

In FIG. 10 a second alternative embodiment is shown having the picture 40 mounted on an insert 46 that has been inserted in the slot between the display 43 and the light guide 42. The insert 46 is preferably made in a transparent material to allows light from the light guide 42 to pass through, but might also be in a non-transparent material. The insert 46 with the picture 40 mounted fills the entire slot between the display 43 and the light guide 42 having an adhesive or other suitable holding means to hold the picture 40 onto the insert 46. Another way of holding the picture 40 to the insert 46 would be to insert the picture 40 into the insert or having an insert 46 squeezing the picture 40 at one end. In the latter embodiment the insert 46 might only be a plug that covers the opening to the slot between the display 43 and the light guide 42, and not projects into the slot.

Figure 11:
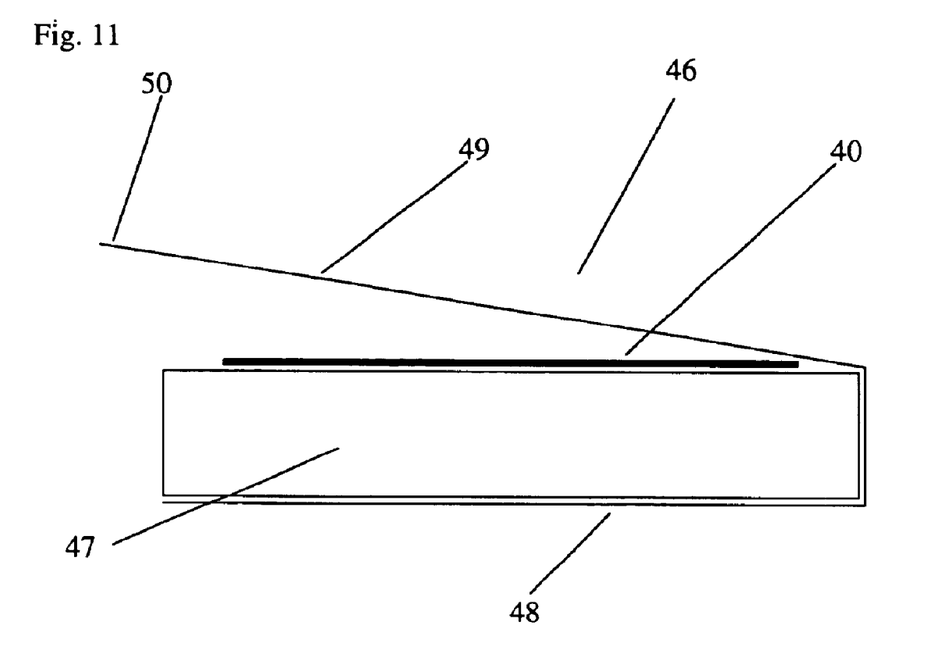
FIGS. 11–12 show different inserts that are used together with the second alternative embodiment in FIG. 10.
Figure 12:
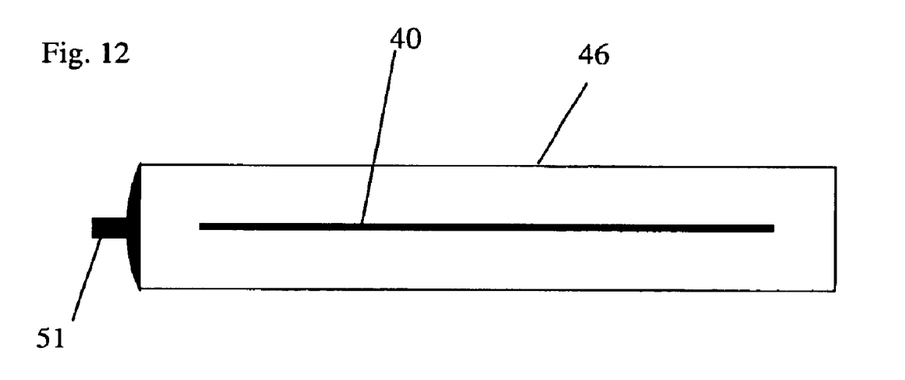

In FIG. 11 is a cross section of an alternative embodiment of the insert 46, where the insert 46 includes a main body 47, a film 48 and a picture 40. The film 48 is attached to the main body 47 along two sides of the main body 47 and having a free part 49. Between the free part 49 of the film 48 and the main body 47 a picture 40 is located that can be easily removed and replaced with another picture 40. The free part 49 of the film 48 is pressed against the main body 47, holding the picture 40, when the insert 46 is inserted in the slot between the display 43 and the light guide 42. The outer part 50 of the film 48 is used as an extractable part to extract the insert 46 from the slot.

The picture 40 could also be an incorporated part of the insert 46 (See FIG. 12), where the user replaces the entire insert 46 including the picture 40 with another insert 46 including another picture 40. The insert 46 shown in FIG. 12 also includes an extractive part 51 to extract the insert 46 from the slot.

The transparency of the display 43 in the display assembly 1 can be adjusted by adding a semi-transparent film on the side facing the insert or closest to the light guide 42.

To replace the picture 40 in a communication unit according to the alternative embodiments shown in FIGS. 9 and 10 the user will first remove the back cover 13 where after he/she removes the front cover 2. The next step is to extract the picture 40 or the insert 46 holding the picture 40 from the holder in the display assembly 1. The user gets hold of the extracting part on the picture 40 or insert 46 and pulls it out. The user changes the extracted picture 40 or insert 46 to another one and inserts it again. The picture 40 or insert 46 holding the picture 40 has been changed in the communication unit according to the user's preference. In the case that the same insert 46 is used to hold both pictures 40, the pictures 40 will be changed in the insert 46 before the insert 46 is inserted into the holder again. After the picture 40 or insert 46 has been inserted the front cover 2 and the back cover 13 will be remounted on the communication unit again.

The picture 40 could be made of any suitable material that permits light to transfer through the material. The material used could be most kinds of paper, plastics or other any other material matching the specifications. The picture can be a personal photo, picture or image, but also any form of art, design, drawing, logo etc.

The invention is not limited to the above-described examples or to the drawings showing examples of an embodiment, but can be varied within the scope of the appended claims.

What is claimed is:

1. A communication unit which provides personalization for a user thereof by providing a view of an image placed inside the unit comprising:

a back cover part which is removable from a remainder of the communication unit including at least a portion through which the image is viewed to provide the personalization, the remainder of the communication unit including a cavity containing internal parts of the communication unit including a display which displays information to a user during use of the communication unit which are not accessible to the user during use; and an image holder releasably holding the image inside the cavity for viewing through the at least a portion of the back cover part by the user during use of the communication unit, and wherein during use of the communication unit the cover part is not removed and the cavity is closed.

2. A communication unit in accordance with claim 1 wherein:

image is releasably held by attachment of the image holder to an internal part of the communication unit within the cavity.

3. A communication unit in accordance with claim 2 wherein the image holder comprises:

a holding flap of plastic film which at one end is attached to the back cover part and has an adhesive strip in a middle part of the flap.

4. A communication unit in accordance with claim 3 wherein:

the adhesive strip holds a picture while in the image holder.

5. A communication unit in accordance with claim 3 wherein:

the image holder includes stickers placed at four corners of the image.

6. A communication unit in accordance with claim 3 wherein:

the image holder includes plastic film that is attached to the cover plate along three sides of the plastic film.

7. A communication unit in accordance with claim 3 wherein:

the image holder includes an adhesive transparent film on which a picture is placed that is attached to the cover part.

8. A communication unit in accordance with claim 1 wherein:

image holder is located on an inside surface of the back cover part which faces the cavity.

9. A communication unit in accordance with claim 1 wherein the image holder comprises:

a holding flap of plastic film which at one end is attached to the back cover part and has an adhesive strip in a middle part of the flap.

10. A communication unit in accordance with claim 9 wherein:

the adhesive strip holds a picture while in the image holder.

11. A communication unit in accordance with claim 9 wherein:

the image holder includes stickers placed at four corners of the image.

12. A communication unit in accordance with claim 9 wherein:

the image holder includes plastic film that is attached to the cover plate along three sides of the plastic film.

13. A communication unit in accordance with claim 9 wherein:

the image holder includes an adhesive transparent film on which a picture is placed that is attached to the cover part.

14. In a communication unit which provides personalization for a user thereof by providing a view of an image placed inside the unit including a back cover part which is removable from a remainder of the communication unit including at least a portion through which the image is viewed to provide the personalization, the remainder of the communication unit including a cavity containing internal parts of the communication unit including a display which displays information to a user during use of the communication unit which are not accessible to the user during use, and an image holder releasably holding an image inside the cavity for viewing through a back cover part by the user during use of the communication unit and wherein during use of the communication unit the back cover part is not removed and the cavity is closed, a method comprising:

choosing an image to be releasably held by the image holder;

placing the image in the image holder; and attaching the back cover part to the remainder of the communication unit to close the cavity.

15. In a communication unit which provides personalization for a user thereof by providing a view of an image placed inside the unit including a back cover part which is removable from a remainder of the communication unit including at least a portion through which the image is viewed to provide the personalization, the remainder of the communication unit including a cavity containing internal parts of the communication unit including a display which displays information to a user during use of the communication unit which are not accessible to the user during use, and an image holder releasably holding an image inside the cavity for viewing through a back cover part by the user during use of the communication unit, and wherein during use of the communication unit the back cover part is not removed and the cavity is closed, a method comprising:

removing an image held by the image holder;

replacing the image in the holder; and attaching the back cover part to the remainder of the communication unit to close the cavity.

16. In a communication unit which provides personalization for a user thereof by providing a view of an image placed inside the unit including a cover part which is removable from a remainder of the communication unit including at least a portion through which the image is viewed to provide the personalization, the remainder of the communication unit including a cavity containing internal parts of the communication unit including a display which displays information to a user during use of the communication unit which are not accessible to the user during use, and wherein during use of the communication unit the back cover part is not removed and the cavity is closed, the remainder of the communication unit comprising:

an image holder releasably holding the image inside the cavity for viewing through the back cover part by the user during use of the communication unit.

17. The remainder of the communication unit of claim 16 wherein:

the image holder includes a holding flap of a plastic film that is at one end attached to the back cover part of the communication unit and has an adhesive strip in the middle part of the flap.

18. The cover part of claim 17 wherein:

the adhesive strip in the middle part of the flap holds the image.

19. The cover part of claim 16 wherein:

the image holder includes stickers that are placed at four corners of the image.

20. The remainder of the communication unit of claim 16 wherein:

the image holder includes a plastic film that is attached to the cover part along three sides of the film.

21. The remainder of the communication unit of claim 16 wherein:

the image holder includes an adhesive transparent film on which an image is placed that is attached to the back cover part.

22. In a communication unit which provides personalization for a user thereof by providing a view of an image placed inside the unit including a cover part which is removable from a remainder of the communication unit including at least a portion through which the image is viewed to provide the personalization, the remainder of the communication unit including a cavity containing internal parts of the communication unit including a display which displays information to a user during use of the communication unit which are not accessible to the user during use, and an image holder releasably holding an image and holding the image inside the cavity for viewing through a back cover part by the user during use of the communication unit and wherein during the use of the communication unit the back cover part is not removed and the cavity is closed, a method comprising:

choosing an image to be releasably held by the image holder;

placing the image which has been chosen in the image holder on the back cover part; and attaching the back cover part to the remainder of the communication unit to close the cavity.

* * * * *

UNITED STATES PATENT AND TRADEMARK OFFICE
CERTIFICATE OF CORRECTION

PATENT NO. : 6,980,825 B1
DATED : December 27, 2005
INVENTOR(S) : Andersen et al.

It is certified that error appears in the above-identified patent and that said Letters Patent is hereby corrected as shown below:

<u>Column 6,</u>
Line 61, before "image" insert -- the --.

Signed and Sealed this

Eighteenth Day of April, 2006

JON W. DUDAS
*Director of the United States Patent and Trademark Office*